United States Patent [19]

Bates et al.

[11] Patent Number: 6,131,110
[45] Date of Patent: Oct. 10, 2000

[54] SYSTEM AND METHOD FOR PREDICTING USER INTEREST IN UNACCESSED SITE BY COUNTING THE NUMBER OF LINKS TO THE UNACCESSED SITES IN PREVIOUSLY ACCESSED SITES

[75] Inventors: Cary Lee Bates; Paul Reuben Day, both of Rochester, Minn.

[73] Assignee: International Business Machines Corporation, Armonk, N.Y.

[21] Appl. No.: 08/893,471

[22] Filed: Jul. 11, 1997

[51] Int. Cl.[7] .............................. G06F 15/16; G06F 3/00
[52] U.S. Cl. ............................................. 709/203; 345/333
[58] Field of Search ........................ 395/200.31–200.33, 395/200.47–200.49; 345/333–335, 356–357; 707/10, 104; 709/201–203, 217–219

[56] References Cited

U.S. PATENT DOCUMENTS

| | | | |
|---|---|---|---|
| 5,625,781 | 4/1997 | Cline et al. | 345/335 |
| 5,704,017 | 12/1997 | Heckerman et al. | 706/12 |
| 5,727,129 | 3/1998 | Barrett et al. | 706/10 |
| 5,754,939 | 5/1998 | Herz et al. | 455/4.2 |
| 5,774,123 | 6/1998 | Matson | 345/357 |
| 5,801,702 | 9/1998 | Dolan et al. | 345/357 |
| 5,855,015 | 12/1998 | Shoham | 707/5 |
| 5,895,470 | 4/1999 | Pirolli et al. | 707/102 |
| 5,926,180 | 6/1999 | Shimamura | 345/357 |
| 5,937,163 | 8/1999 | Lee et al. | 709/218 |
| 5,937,397 | 8/1999 | Callaghan | 706/10 |
| 6,037,935 | 3/2000 | Bates et al. | 345/335 |
| 6,038,574 | 3/2000 | Pitkow et al. | 707/513 |

OTHER PUBLICATIONS

The simple story of aqui, www.aqui.ibm.com.
Domel, P., "WebMap: A Graphical Hypertext Navigation Tool," Comp. Networks & ISDN Systems, vol. 28, No. 1–2, pp. 85–97, Dec. 1995.
Brown, M., et al., "DeckScape: An Experimental Web Browser," Comp. Networks & ISDN Systems, vol. 27, No. 6, pp. 1097–1104, Dec. 1995.
Armstrong, R., et al., "WebWatcher: A Learning Apprentice for the World Wide Web,"AAAI Spring Symposium on Information Gathering from Heterogeneous, Distributed Environments, pp. 1–7, Mar. 1995.
Joachims, T., et al., "WebWatcher: Machine Learning and Hypertext," School of Comp. Science, Carnegie Mellon Univ. pp. 1–5, May 1995.
Yuwono et al., "Search and Ranking Algorithms for Locating Resources on the World Wide Web," Proc. of the Twelfth Int'l. Conf. on Data Engineering, IEEE, pp. 164–171, Mar. 1996.
Joachims, T., et al., "WebWatcher: A Tour Guide for the World Wide Web," School of Comp. Science, Carnegie Mellon Univ., pp. 1–26, Sep. 1996.
Mladenic, D., "Personal WebWatcher; Design and Implementation," Technical Report IJS–DP–7472, Dept. for Intelligent Systems, J. Stefan Institute, pp. 1–18, Oct. 1996.

*Primary Examiner*—Ahmad F. Matar
*Assistant Examiner*—Andrew Caldwell
*Attorney, Agent, or Firm*—Felsman, Bradley, Vaden, Gunter & Dillon, LLP

[57] ABSTRACT

A method and system for identifying prospective sites in a remote network for which a user may have an affinity by detecting links to specific sites within sites previously accessed by a user, the remote network having multiple locations linked together based upon a commonality of subject matter. Initially, in response to user input, sites are accessed which contain links to other sites. Sites not previously accessed by the user are identified which have links contained within the accessed sites. Sites not previously accessed by the user are then prioritized according to the number of links contained within the accessed sites. Thereafter, the user is provided with an indication of the priority of sites not previously accessed by the user according to the number of links to each of the sites not previously accessed by the user contained within the accessed sites. In addition, the list of sites having links to the accessed sites can be arranged according to the number of links contained within the accessed sites. In response to arranging the list of sites having links to the accessed sites according to the number of links contained within the accessed sites, the links can be designated as interesting based on this arrangement.

20 Claims, 6 Drawing Sheets

SYSTEM AND METHOD FOR PREDICTING USER INTEREST IN UNACCESSED SITE BY COUNTING THE NUMBER OF LINKS TO THE UNACCESSED SITES IN PREVIOUSLY ACCESSED SITES

BACKGROUND OF THE INVENTION

1. Technical Field

The present invention relates in general to improved information processing systems. In particular, the present invention relates to multiple networks in which information processing systems are utilized. Still more particularly, the present invention relates to an improved browser method and system. The present invention also relates to an improved method and system for managing Internet navigation and to a method and system for identifying network sites that may be of interest to users.

2. Description of the Related Art

The development of computerized distributed information resources, such as the "Internet," allows users to link with servers and networks, and thus retrieve vast amounts of electronic information heretofore unavailable in an electronic medium. Such electronic information increasingly is displacing more conventional means of information transmission, such as newspapers, magazines, and even television. The term "Internet" is an abbreviation for "Internetwork," and refers commonly to a collection of computer networks that utilize the TCP/IP suite of protocols, well-known in the art of computer networking. TCP/IP is an acronym for "Transport Control Protocol/Interface Program," a software protocol developed by the Department of Defense for facilitating communications between computers.

Electronic information transferred between computer networks (e.g., the Internet) can be presented to a user in hypertext, a metaphor for presenting information in a manner in which text, images, sounds, and actions become linked together in a complex non-sequential web of associations that permit the user to "browse" through related topics, regardless of the presented order of the topics. These links are often established by both the author of a hypertext document and by the user, depending on the intent of the hypertext document. For example, traveling among links to the word "iron" in an article displayed within a graphical user interface in a computer system might lead the user to the periodic table of the chemical elements (i.e., linked by the word "iron"), or to a reference to the use of iron in weapons in Europe in the Dark Ages. The term "hypertext" is utilized to describe documents, as presented by a computer, that express the nonlinear structure of ideas, as opposed to the linear format of books, film, and speech.

Hypertext, especially in an interactive format where choices are controlled by the user, is structured around the idea of offering a working and learning environment that parallels human thinking—that is, an environment that allows the user to make associations between topics rather than moving sequentially from one topic to the next, as in an alphabetic list. Hypertext topics are linked in a manner that allows users to jump from one subject to other related subjects during a search for information.

Networked systems utilizing hypertext conventions typically follow a client/server architecture. A "client" is a member of a class or group that utilizes the services of another class or group to which it is not related. In the context of a computer network such as the Internet, a client is a process (i.e., roughly a program or task) that requests a service provided by another program. The client process utilizes the requested service without having to "know" any working details about the other program or the service itself. In networked systems, a client is usually a computer that accesses shared network resources provided by another computer (i.e., a server).

A "server" is typically a remote computer system accessible over a communications medium such as the Internet. The server scans and searches for raw (e.g., unprocessed) information sources (e.g., newswire feeds or newsgroups). Based upon such requests by the user, the server presents filtered electronic information to the user as server responses to the client process. The client process may be active in a first computer system, and the server process may be active in a second computer system, and communicate with one another over a communications medium that allows multiple clients to take advantage of the information-gathering capabilities of the server. A server can thus be described as a network computer that runs administrative software that controls access to all or part of the network and its resources, such as disk drivers or printers. A computer acting as a server makes resources available to computers acting as workstations on the network.

Client and server can communicate with one another utilizing the functionality provided by a hypertext transfer protocol (HTTP). The World Wide web (WWW) or, simply, the "web," includes all servers adhering to this protocol, which are accessible to clients via a Universal Resource Locator (URL). Internet services can be accessed by specifying Universal Resource Locators that have two basic components: a protocol to be used and an object pathname. For example, the Universal Resource Locator address, "http://www.uspto.gov" (i.e., the "home page" for the U.S. Patent and Trademark Office), specifies a hypertext transfer protocol ("http" or HTTP) and a pathname ("www.uspto.gov") of the server. The server name is associated with a unique numeric value (i.e., a TCP/IP address). Active within the client is a first process, known as a "browser," that establishes the connection with the server and presents information to the user. The server itself executes corresponding server software that presents information to the client in the form of HTTP responses. The HTTP responses correspond to "web pages" constructed from a Hypertext Markup Language (HTML), or other server-generated data.

A "web page" (also referred to by some designers simply as a "page") is a data file written in a hyper-text language that may have text, graphic images, and even multimedia objects such as sound recordings or moving video clips associated with that data file. The web page can be displayed as a viewable object within a computer system. A viewable object can contain one or more components such as spreadsheets, text, hotlinks, pictures, sound, and video objects. A web page can be constructed by loading one or more separate files into an active directory or file structure that is then displayed as a viewable object within a graphical user interface.

When a client workstation sends a request to a server for a web page, the server first transmits (at least partially) the main hypertext file associated with the web page, and then loads, either sequentially or simultaneously, the other files associated with the web page. A given file may be transmitted as several separate pieces via TCP/IP protocol. The constructed web page is then displayed as a viewable object on the workstation monitor. A web page may be "larger" than the physical size of the monitor screen, and devices such as graphical user interface scroll bars can be utilized by the viewing software (i.e., the browser) to view different portions of the web page.

As various "web sites" are visited via hypertext links displayed within a web browser, URLs representative of the web sites visited during a given web navigation session are typically recorded by the web browser. Because web sites tend to proliferate over time, a user searching for particular or important web sites can find it difficult to find those particular or important web sites. Navigating through existing web sites can be a time consuming task, and often important web sites are not visited. Identifying important web sites is a task that a user must currently perform manually. Manually "bookmarking" such web sites is a "hit and miss" process, left solely to the intuition of the user, which sometimes can be a reliable tool in identifying important web sites, and sometimes cannot. From the foregoing, it can be seen that a need exists for a method and system which would allow a web browser application to automatically identify important web sites, and record these important web sites for later utilization by the user, or at least indicate to the user that a particular web site visited (or not visited) may in fact be an important web site.

SUMMARY OF THE INVENTION

It is therefore one object of the present invention to provide for an improved browser method and system.

It is therefore another object of the present invention to provide an improved information processing system.

It is still another object of the present invention to provide to an improved method and system for managing Internet navigation.

It is yet another object of the present invention to provide an improved method and system for identifying network sites that may be of interest to users.

The above and other objects are achieved as is now described. A method and system are disclosed for identifying prospective sites in a remote network, for which a user may have an affinity, by detecting links to specific sites within sites previously accessed by a user, the remote network having multiple locations linked together based upon a commonality of subject matter. Initially, in response to user input, sites are accessed which contain links to other sites. Sites not previously accessed by the user are identified which have links contained within the accessed sites. Sites not previously accessed by the user are then prioritized according to the number of links contained within the accessed sites. Thereafter, the user is provided with an indication of the priority of sites not previously accessed by the user according to the number of links to each of the sites not previously accessed by the user contained within the accessed sites. In addition, the list of sites having links to the accessed sites can be arranged according to the number of links contained within the accessed sites. In response to arranging the list of sites having links to the accessed sites according to the number of links contained within the accessed sites, the links can be designated as interesting based on this arrangement.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of a preferred embodiment when read in conjunction with the accompanying drawings, wherein:

DETAILED DESCRIPTION OF PREFERRED EMBODIMENT

Figure 1:
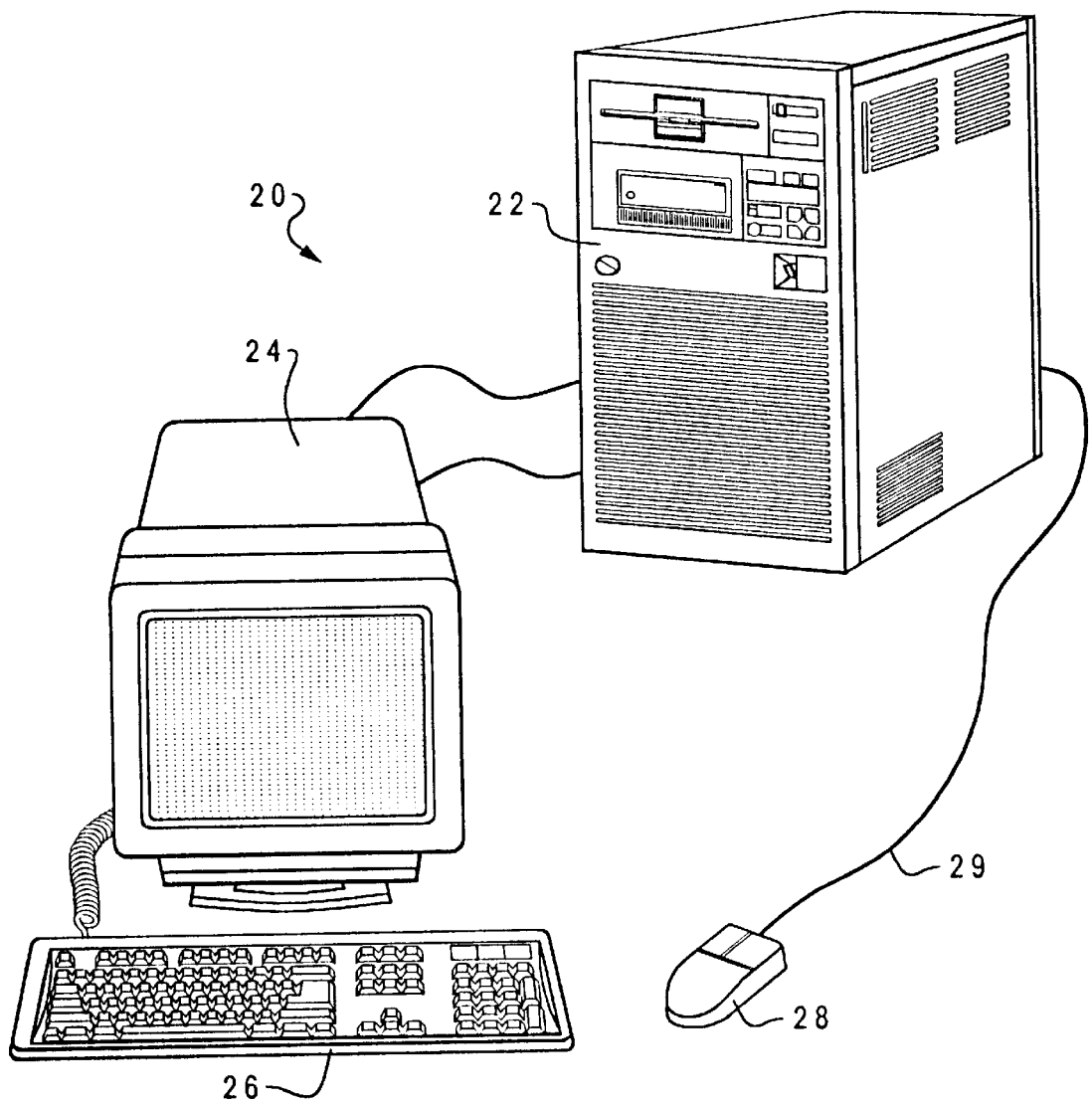
FIG. 1 illustrates a pictorial representation of a computer system which may be utilized to implement a preferred embodiment of the present invention.

With reference now to the figures and in particular with reference to FIG. 1, there is depicted a pictorial representation of a computer system in accordance with a preferred embodiment of the present invention. A computer system 20 is depicted that includes a system unit 22, a video display terminal 24, a keyboard 26, and a mouse 28. System unit 22 typically includes disk and tape drives. Video display terminal 24 is the visual output of computer system 20. Video display terminal 24 can be a cathode-ray tube (CRT) based video display well-known in the art of computer hardware. Keyboard 26 is that part or computer system 20 that resembles a typewriter keyboard and which enables a user to control particular aspects of the computer. Because information flows in one direction, from keyboard 26 to system unit 22, keyboard 26 functions as an input-only device. Functionally, keyboard 26 represents half of a complete input/output device, the output half being video display terminal 24. Keyboard 26 includes a standard set of printable characters presented in a QWERTY pattern typical of most typewriters. In addition, keyboard 26 includes a calculator-like numeric keypad at one side. Some of these keys, such as the "control," "alt," and "shift" keys can be utilized to change the meaning of another key. Other special keys and combinations of keys can be utilized to control program operations or to move either text or cursor on the display screen of video display terminal 24. Mouse 28 is a pointing device that features a casing with a flat bottom that can be gripped by a human hand. Mouse 28 can include buttons on the top of the mouse, a multidirectional detection device such as a ball on the bottom of the mouse, and a cable 29 that connects mouse 28 to the computer.

Figure 2:
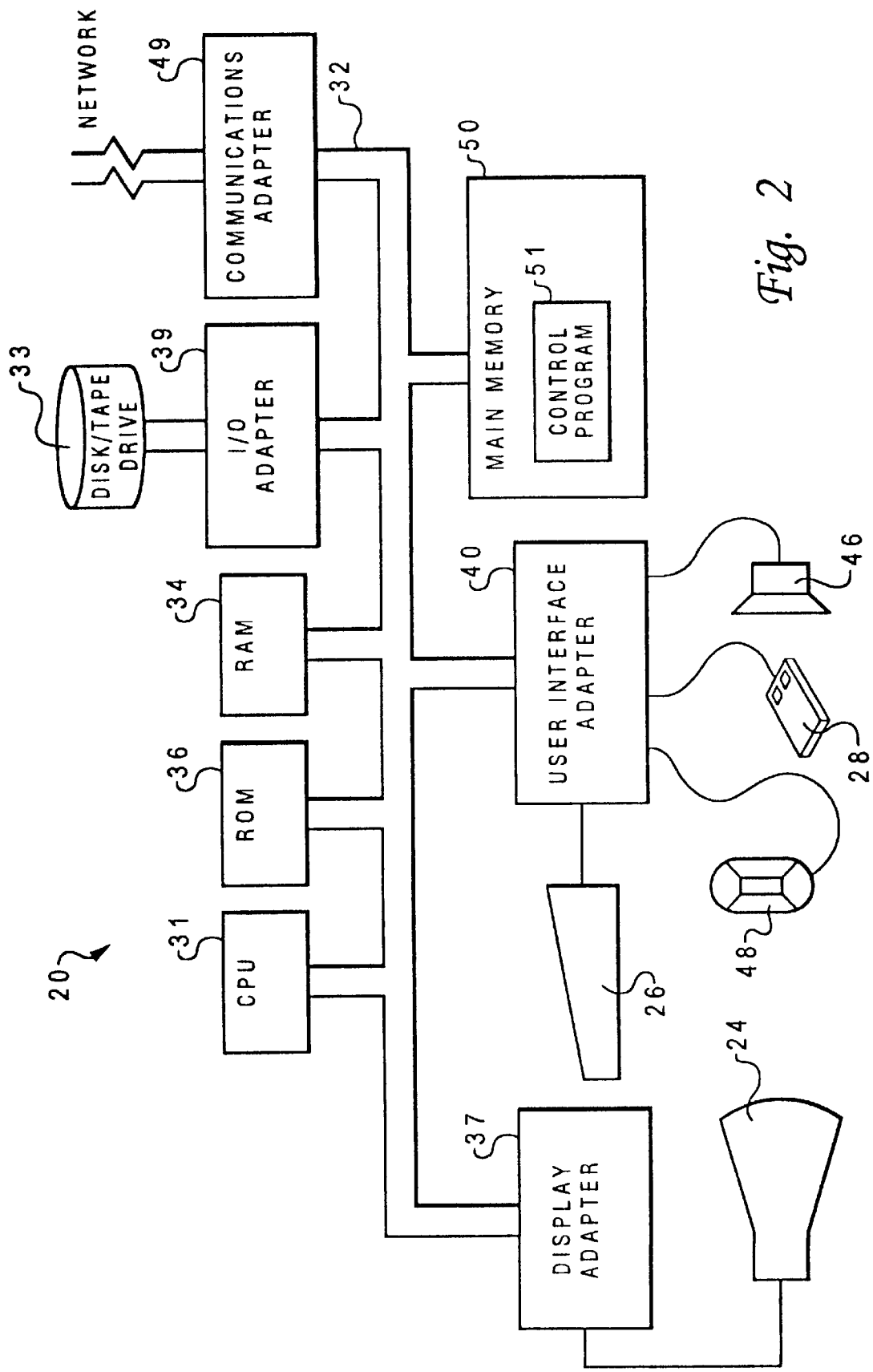
FIG. 2 depicts a representative hardware environment of the computer system illustrated in FIG. 1.

Computer system 20 can be implemented utilizing any suitable computer such as the AS/400 computer system or IBM "Aptiva" computer, both products of International Business Machines Corporation, located in Armonk, N.Y. However, those skilled in the art will appreciate that a preferred embodiment of the present invention can apply to any computer system, regardless of whether the computer system is a complicated multi-user computing apparatus or a single-user workstation. In FIG. 1 and FIG. 2, like parts are identified by like numbers. Computer system 20 is thus a configuration that includes all functional components of a computer and its associated hardware. In general, a typical computer system includes a console or system unit such as system unit 22, with one or more disk drives, a monitor such as video display terminal 24, and a keyboard such as keyboard 26. Additional hardware, often referred to in the art as peripheral devices, can include devices such as printers, modems, and joysticks.

FIG. 2 depicts a representative hardware environment of the computer system illustrated in FIG. 1. Computer system 20 includes a Central Processing Unit ("CPU") 31, such as a conventional microprocessor, and a number of other units interconnected via system bus 32. CPU 31 includes a portion of computer system 20 that controls the operation of the entire computer system, including executing the arithmetical and logical functions contained in a particular computer program. Although not depicted in FIG. 2, CPUs such as CPU 31 typically include a control unit that organizes data and program storage in a computer memory and transfers the data and other information between the various parts of the computer system. Such CPUs also generally include an arithmetic unit that executes the arithmetical and logical operations, such as addition, comparison, multiplications and so forth. Such components and units of computer system 20 can be implemented in a system unit such as system unit 22 of FIG. 1.

Computer system 20 further includes random-access memory (RAM) 34, read-only memory (ROM) 36, display adapter 37 for connecting system bus 32 to video display terminal 24, and I/O adapter 39 for connecting peripheral devices (e.g., disk and tape drives 33) to system bus 32. RAM 34 is a type of memory designed such that the location of data stored in it is independent of the content. Also, any location in RAM 34 can be accessed directly without having to work through from the beginning. ROM 36 is a type of memory that retains information permanently and in which the stored information cannot be altered by a program or normal operation of a computer.

Video display terminal 24 is the visual output of computer system 20. As indicated herein, video display terminal 24 can be a cathode-ray tube (CRT) based video display well-known in the art of computer hardware. However, with a portable or notebook-based computer, video display terminal 24 can be replaced with a liquid crystal display (LCD) based or gas plasma-based flat-panel display. Those skilled in the art will appreciate that the configuration depicted in FIG. 1 is but one possible implementation of the components depicted in FIG. 2. Portable and "laptop" based computers are other possible configurations. Computer system 20 further includes user interface adapter 40 for connecting keyboard 26, mouse 28, speaker 46, microphone 48, and/or other user interface devices, such as a touch-screen device (not shown), to system bus 32. Communications adapter 49 connects computer system 20 to a computer network. Although computer system 20 is shown to contain only a single CPU and a single system bus, it should be understood that the present invention applies equally to computer systems that have multiple CPUs and to computer systems that have multiple buses that each perform different functions in different ways.

Disk and tape drives 33 are electromechanical devices that read from and write to disks. The main components a disk drive in particular can include are a spindle on which the disk is mounted, a drive motor that spins the disk when the drive is in operation, one or more read/write heads that perform the actual reading and writing, a second motor that positions the read/write heads over the disk, and controller circuitry that synchronizes read/write activities and transfers information to and from computer system 20. A disk itself is typically a round, flat piece of flexible plastic (e.g., floppy disk) or inflexible metal (e.g. hard disk) coated with a magnetic material that can be electrically influenced to hold information recorded in digital (i.e., binary) form. A disk is, in most computers, the primary method for storing data on a permanent or semipermanent basis. Because the magnetic coating of the disk must be protected from damage and contamination, a floppy (e.g., 5.25 inch) disk micro-floppy (e.g., 3.5 inch) disk is encased in a protective plastic jacket. A hard disk, which is very finely machined, is typically enclosed in a rigid case and can be exposed only in a dust free environment.

Computer system 20 also includes an interface that resides within a machine-readable media to direct the operation of computer system 20. Any suitable machine-readable media may retain the interface, such as RAM 34, ROM 36, a magnetic diskette, magnetic tape, or optical disk (the last three being located in disk and tape drives 33). Any suitable operating system and associated interface (e.g., Microsoft Windows) may direct CPU 31. For example, the AIX operating system and AIXwindows windowing system can direct CPU 31. The AIX operating system is IBM's implementation of the UNIX operating system. UNIX is a trademark of UNIX Systems Laboratories, Inc. Other technologies also can be utilized in conjunction with CPU 31, such as touch-screen technology or human voice control. Operating systems typically include computer software for controlling the allocation and usage of hardware resources such as memory, CPU time, disk space, and peripheral devices. The operating system is the foundation upon which applications, such as word-processing, spreadsheet, and web browser programs are built.

Those skilled in the art will appreciate that the hardware depicted in FIG. 2 may vary for specific applications. For example, other peripheral devices such as optical disk media, audio adapters, or chip programming devices, such as PAL or EPROM programming devices well-known in the art of computer hardware and the like, may be utilized in addition to or in place of the hardware already depicted. In addition, main memory 50 is connected to system bus 32, and includes a control program 51. Control program 51 resides within main memory 50, and contains instructions that, when executed on CPU 31, carries out the operations depicted in the logic flowchart of FIG. 7 and FIG. 8 described herein. The computer program product also can be referred to as a program product. Control program 51 contains instructions that when executed on CPU 31 can carry out logical operations such as those operations depicted in the logic flow charts of FIG. 7 and FIG. 8 described herein.

It is important to note that, while the present invention has been (and will continue to be) described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives, and CD ROMs, and transmission-type media such as digital and analog communication links. Examples of transmission media include devices such as modems. Modems are communication devices that enable computers such as computer 20 depicted in FIG. 1 and FIG. 2 to transmit information over standard telephone lines.

Figure 3:
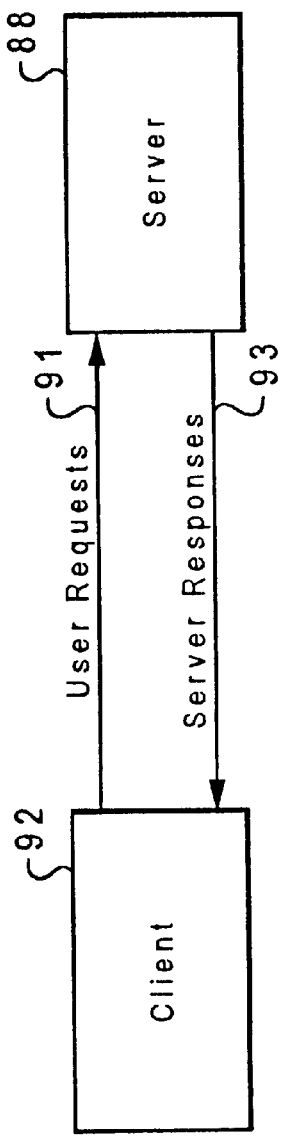
FIG. 3 illustrates a block diagram illustrative of a client/server architecture in accordance with a preferred embodiment of the present invention.
Figure 4:
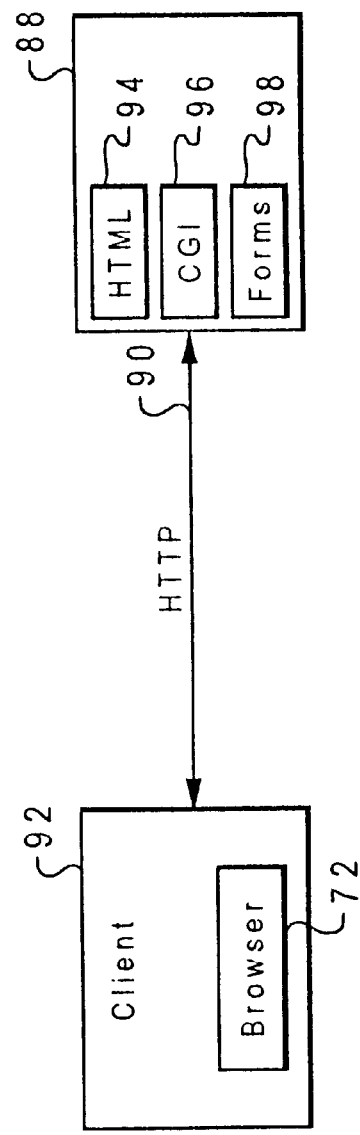
FIG. 4 depicts a detailed block diagram of a client/server architecture in accordance with a preferred embodiment of the present invention.
Figure 5:
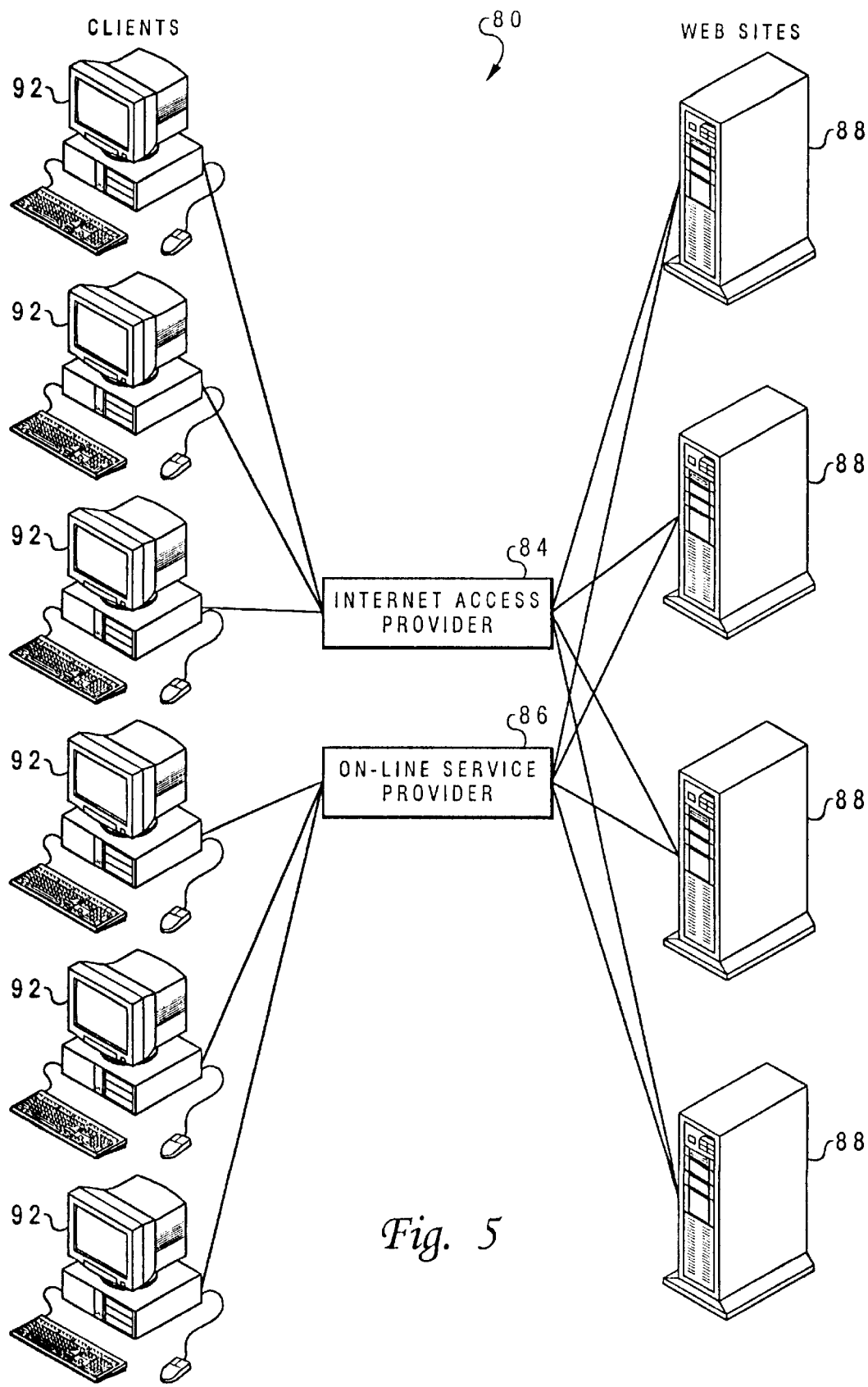
FIG. 5 is a diagram illustrative of a computer network which can be implemented in accordance with a preferred embodiment of the present invention.

In FIG. 3, FIG. 4, and FIG. 5, like parts are indicated by like numbers. FIG. 3 illustrates a block diagram illustrative of a client/server architecture in accordance with a preferred embodiment of the present invention. In FIG. 3, user requests 91 for news are sent by a client application program 92 to a server 88. Server 88 can be a remote computer system accessible over a computerized distributed information resource such as the Internet or other communications network. Client application program 92 may be utilized with computer 20 of FIG. 1 and the implementation of computer 20 illustrated in FIG. 2. Server 88 performs scanning and searching of raw (e.g., unprocessed) information sources (e.g., newswire feeds or newsgroups) and, based upon these user requests, presents the filtered electronic information as server responses 93 to the client process. The client process may be active in a first computer system, and the server process may be active in a second computer system, communicating with one another over a communications medium, thus providing distributed functionality and allowing multiple clients to take advantage of the information-gathering capabilities of the server.

FIG. 4 illustrates a detailed block diagram of a client/server architecture in accordance with a preferred embodiment of the present invention. Although the client and server are processes that are operative within two computer systems, these processes being generated from a high-level programming language (e.g., PERL), which is interpreted and executed in a computer system at runtime (e.g., a workstation), it can be appreciated by one skilled in the art that they may be implemented in a variety of hardware devices, either programmed or dedicated.

Client 92 and server 88 communicate by utilizing the functionality provided by HTTP. Active within client 92 is a first process, browser 72, which establishes connections with server 88, and presents information to the user. Any number of commercially or publicly available browsers can be utilized in various implementations in accordance with the preferred embodiment of the present invention. For example, the Mosaic-brand browser available from the National Center for Supercomputing Applications (NCSA) in Urbana-Champaign, Ill., can be utilized in accordance with a preferred embodiment of the present invention. Other browsers, such as Netscape™, also provide the functionality specified under HTTP. "Netscape" is a trademark of Netscape, Inc.

Server 88 executes the corresponding server software, which presents information to the client in the form of HTTP responses 90. The HTTP responses 90 correspond with the web pages represented using HTML, or other data generated by server 88. Server 88 provides HTML 94. Under certain browsers, such as the Mosaic-brand browser described herein, a Common Gateway Interface (CGI) 96 is also provided, which allows the client program to direct server 88 to commence execution of a specified program contained within server 88. This may include a search engine that scans received information in the server for presentation to the user controlling the client. Using this interface, and HTTP responses 90, the server may notify the client of the results of that execution upon completion. Common Gateway Interface (CGI) 96 is one form of a gateway, a device utilized to connect dissimilar networks (i.e., networks utilizing different communications protocols) so that electronic information can be passed from one network to the other. Gateways transfer electronic information, converting such information to a form compatible with the protocols used by the second network for transport and delivery.

In order to control the parameters of the execution of this server-resident process, the client may direct the filling out of certain "forms" from the browser. This is provided by the "fill-in-forms" functionality (i.e., forms 98), which is provided by some browsers, such as the Mosaic-brand browser described herein. This functionality allows the user via a client application program to specify terms in which the server causes an application program to function (e.g., terms or keywords contained in the types of stories/articles which are of interest to the user). This functionality is an integral part of the search engine.

FIG. 5 is a diagram illustrative of a computer network 80, which can be implemented in accordance with a preferred embodiment of the present invention. Computer network 80 is representative of the Internet, which can be described as a known computer network based on the client-server model discussed herein. Conceptually, the Internet includes a large network of servers 88 that are accessible by clients 92, typically users of personal computers, through some private Internet access provider 84 (e.g., such as Internet America) or an on-line service provider 86 (e.g., such as America On-Line, Prodigy, Compuserve, and the like). Each of the clients 92 may run a browser to access servers 88 via the access providers. Each server 88 operates a so-called "web site" that supports files in the form of documents and pages. A network path to servers 88 is identified by a Universal Resource Locator having a known syntax for defining a network collection.

Figure 6:
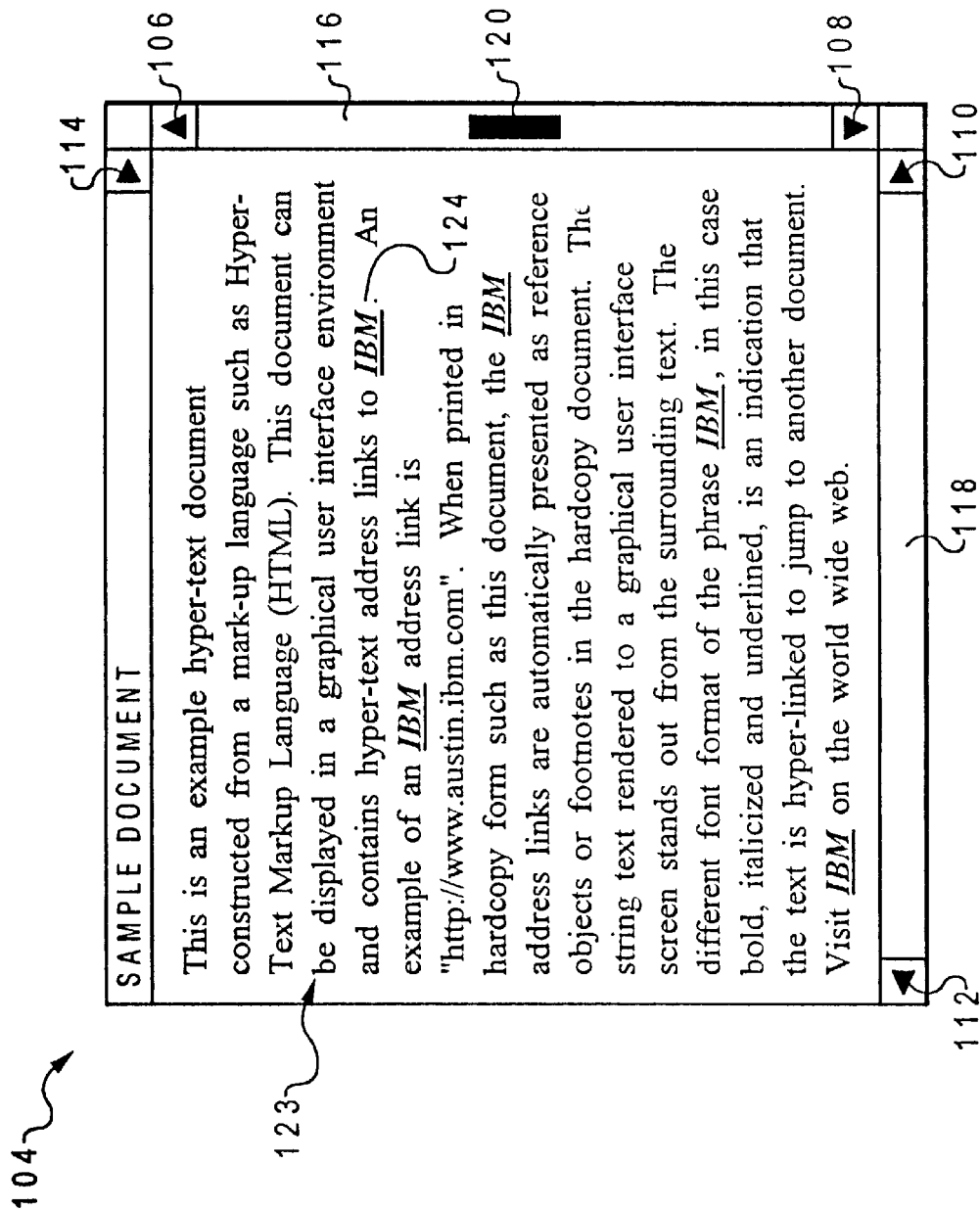
FIG. 6 illustrates an example hypertext document contained within a graphical user interface window and which can be utilized in accordance with the method and system of the present invention.

FIG. 6 illustrates an example hypertext document 123 contained within a graphical user interface window 104, which can be utilized in accordance with a preferred embodiment of the present invention. Note that a graphical user interface is a type of display format that enables the user to choose commands, start programs, and see lists of files and other options by pointing to pictorial representations (i.e., icons) and lists of menu items on the screen (i.e., monitor screen). Choices can generally be activated with a keyboard or a mouse. Window 104 displays a portion of a viewable object (i.e., hypertext document 123) constructed from a mark-up language. One such mark-up language that can be utilized in accordance with the example presented in FIG. 6, is the Hypertext Mark-up Language (HTML). The size and position of elevator 120 within scroll bar 116 corresponds to the size and position of the current viewable page in relation to hypertext document 123. Hypertext document 123 can be accessed from a computer system contained within a computer network such as the Internet.

In the example of FIG. 6, because hypertext document 123 includes too many pages to view simultaneously, the user can position a mouse cursor over up-arrow section 106 or arrow section 108 of scroll bar 116 and click a pointing device (e.g., a mouse) to scroll the hypertext document 123 upward or downward, as appropriate. A vertical scroll bar 118 includes arrow sections 112 and arrow sections 110 for scrolling hypertext document 123 respectively in a left or right direction. Also, an optional arrow section 114 allows a user to scroll the document in the right direction. Those skilled in the art will of course appreciate that such directional conventions are well known in the art and are not necessary features of the present invention. Rather, such features represent specific types of graphical user interface components that can be utilized in accordance with a preferred embodiment of the present invention. The graphical user interface that contains window 104 and hypertext document 123 is a type of computer display format that enables a user to choose commands, start programs, and see lists of files and other options by pointing to pictorial representations (i.e., icons) and lists of menu items on the screen. Choices can generally be activated either with a keyboard or a pointing device such as mouse 28 depicted in FIG. 1.

Hypertext document 123 contains specific string text 124 rendered on the screen by the graphical user interface to stand out from the surrounding text. String text 124 is rendered in a different format. In the example of FIG. 6, string text 124 is rendered as IBM. The different font format of string text 124 is an indication that the text is hyperlinked to "jump" to another hypertext document. When a user clicks on string text 124 with a mouse or other pointing device, the graphical user interface shifts the presently viewed hypertext document 123 to another hyper-linked document (i.e., to another web page or web site). Note that the term "hypertext document" as utilized herein simply refers to a web page or web site that may include hypertext links to other web pages or web sites. Highlighting of displayed hypertext links can also indicate that the highlighted text is hyper-linked to "jump" to another hypertext document. Highlighting then is one method for altering the appearance of displayed characters or text in order to call attention to them. For example, greater attention can be focused on particular characters or text by displaying such characters or text with a higher intensity than surrounding characters or text, or by utilizing reverse video (i.e., dark on light as opposed to light on dark, or vice versa).

Figure 7:
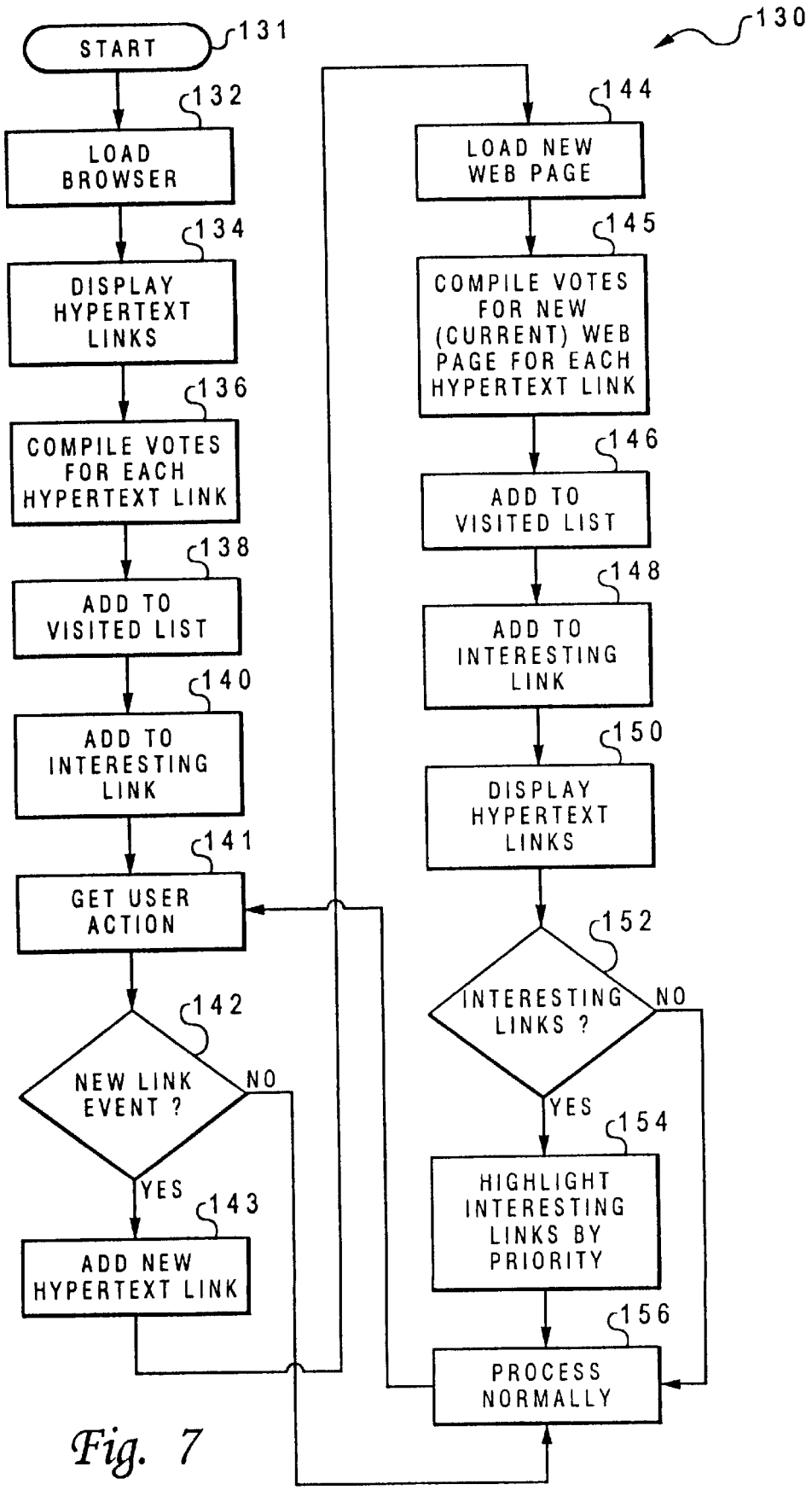
FIG. 7 illustrates a flow diagram that shows steps used to carry out the method and system, according to a preferred embodiment of the present invention.

FIG. 7 is a flow diagram 130 that shows steps that can be utilized to carry out the method and system, according to a preferred embodiment of the present invention. It can be appreciated by those skilled in the art that FIG. 7 presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind. The present invention relates to method steps for operating a computer, such as computer 20 depicted in FIG. 1 and FIG. 2, in processing electrical or other (e.g. mechanical, chemical) physical signals to generate other desired physical signals.

Thus, as depicted at block 131, the process described herein is initiated. As illustrated at block 132, a browser (e.g., browser 72 of FIG. 4) is loaded into a working directory of a data-processing system for utilization by a graphical user interface. In essence, in response to user input, a site is accessed which contains hypertext links to other sites. Displayed within the browser are hypertext links, as indicated at block 134. The hypertext links are typically displayed within a web page, well known in the art of graphical user interfaces as a graphical user interface device for displaying data. A hypertext link can be activated utilizing a pointing device such as a mouse, well known in the art of graphical user interfaces. As illustrated at block 136, "votes" are compiled for each hypertext link encountered.

The concept of "votes" is based on the premise that if there are many other web pages that have hypertext links to a particular page, then the creators of those original pages must have believed that the information on those other pages would be of interest to the user accessing or visiting their page. Conceptually, then, the fact that a page contains a hypertext link to another page can be viewed as "vote" for the user to look at that other page. As the user visits these pages, the sites visited are tracked along with the hypertext links that are found in the pages visited or accessed. Thus, two lists are compiled: a "visited list" and an "interesting list."

Within the interesting list the number of "votes" each of the "interesting sites" have accumulated are also tracked. Thus, sites not previously accessed by the user are prioritized according to a number of links contained within sites accessed by the user, including the presently displayed web page or "site." Those sites having hypertext links with the most number of "votes" are given a higher priority than those having a lower number of "votes." The fact that a particular hypertext link contained within the "interesting list" has a higher number of tallied "votes" than another hypertext link is an indication to the user that the hypertext link may have more relevance to the user because this hypertext link is a link to an "interesting site." As described at block 138, the site accessed and loaded into the browser, as described in blocks 132 and 134 herein, is added to the "visited list." As depicted at block 140, hypertext links contained within the accessed site which have not been previously visited by the user, are added to the "interesting list."

As described at block 141, the phrase "get user action" refers to an event that can be caused by user input such as clicking on a hypertext link with a pointing device or via user input derived from a keyboard. As indicated at block 142, a test is performed to determine whether or not a new link event (i.e., activating a new hypertext link to another web page) has been initiated by the user action that occurred previously, as illustrated at block 141. If the user action is not a new link event, then as depicted at block 156, the web browser simply continues to process normally. However, if the user action is a new link event, then as illustrated at block 143, in response to user input, a new hypertext link is activated, and a new web page is subsequently loaded into the web browser and displayed via a graphical user interface for the user, as described at block 144.

The newly displayed web page may or may not contain hypertext links to other sites or other web pages. As depicted at block 145, following the display of the new web page, votes are compiled for the new or currently displayed web page for each hypertext link maintained within that new or currently displayed web page. Thus, as described at block 145, votes are tallied for the currently displayed web page in the same manner as was performed for the previously displayed web page (i.e., analogous to the operation described at block 136). As illustrated at block 146, the site accessed (i.e., the new or currently displayed web page) and loaded into the browser, is added to the "visited list." As depicted at block 148, hypertext links contained within the accessed site which have not been previously visited by the user, are added to the "interesting list." As depicted at block 150, all hypertext links from the new or currently displayed web page to other web pages are displayed within the new or currently displayed web page.

As described at block 152, a test is then performed to determine whether any of the hypertext links displayed within the currently displayed web page are contained within the "interesting list" of hypertext links. If no hypertext links are contained within the "interesting list," then as depicted at block 156, the process continues normally. If any of the hypertext links displayed within the currently displayed web page are contained within the "interesting list," then the hypertext links are highlighted according to priority, as illustrated at block 154. The operation described at block 156 continues until a user action (e.g., mouse clock, keyboard input, etc.) occurs. If it is determined that the user action is a new link event, then the process repeats as described herein. If not, normal web browser and graphical user interface operations continue, as described at block 156. Thus, when a page is displayed that contains a hypertext link to one of these "interesting" sites, the hypertext link is highlighted over and above the normal highlight for any hypertext link, to set it off from the rest of the hypertext links, so that the user is aware that this hypertext link may be an interesting site to visit. The greater the highlight, the greater an indication to the user that the site is probably an "interesting" or "important" site that the user ought to visit.

The amount of highlighting is thus directly related to the number of votes that the sites have accumulated. Those skilled in the art will of course appreciate that highlighting text displayed within a web site or web page is not the only technique that can be utilized to indicate priority as described herein. Other techniques can also be utilized to indicate priority. For example, a rectangular box can be drawn about the identified "interesting" hypertext links to indicate to the user that the hypertext link contained within the boundaries of the rectangular box is a potentially "interesting" or "important" site, one that the user ought to visit. In additional, a number can be placed within or near the boundaries of such a rectangular box to indicate priority. For example, the numbers can be in the range of one to ten on a page having ten hypertext links contained within the "interesting list." A number "10" beside or within the box can indicate a high priority, while a number "5" would indicate a medium priority. A number "1" could indicate the lowest priority. Such a prioritization method can be implemented in accordance with a preferred embodiment of the present invention. The aforementioned highlighting aspect also provides a mechanism for the visual enhancement of important network or web sites.

Those skilled in the art will appreciate that alternative preferred embodiments of the present invention can be presented. For example, a preferred embodiment of the present invention can include a so-called "hot key," which allows a user to display a list of accumulated "interesting" uniform resource locators (URLs), from URLs designated "least" interesting to URLs designated "most" interesting, based on the prioritatizion method described herein. The user can then view this list and utilizing a mouse pointer, choose an URL on the list and navigate to a web site associated with the particular URL chosen. A hot key can be a one or two keystroke command that switches a user to a different program.

In addition, a preferred embodiment of the present invention can include a "clear" or "checkpoint" function that resets the "interesting list." Such "clear" or "checkpoint" functions are well known in the art of graphical user interfaces and web browsers and can be implemented in accordance with a preferred embodiment of the present invention. An additional feature that can be implemented in accordance with a preferred embodiment of the present invention includes a function that allows a user to search at a deeper level to locate interesting links. For example, a vote scale can be applied to those links that rate heavily as "interesting links" such that only those links that rate as "very interesting" (e.g., a "9" or "10" on a priority scale of 1 to 10) are highlighted to indicate to the user that these particular sites are the sites that he or she should search further.

In addition, such a vote scale can be further refined to take into account the fact that certain links may not be as desirable as other links in tallying "votes." For example, if site A is linked to site B, and site B is never visited by the user, links from site B can be counted as votes. However, because links from site B "once removed," their weight is less than the weight of links from site A. Therefore, links from site A may count as 1 vote, while links from site B may count less than 1 vote (e.g., ½ vote or ¼ vote). Those skilled in the art will appreciate that still further additional refined features can be implemented in accordance with a preferred embodiment of the present invention. For example, provision can be made for a feature that prevents "votes" from being cast more than once during a second visit to a particular web site. Such a feature is particularly useful. when a user visits a site a second time (e.g., when a user is "backing out"). In such a case, the aforementioned "visited list" is utilized in such a manner as to not count "votes" from that particular site more than once.

The embodiments and examples set forth herein are presented in order to best explain the present invention and its practical application and, thereby, to enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method for identifying prospective sites in a remote network, for which a user may have an affinity, by detecting links to specific sites within sites previously accessed by a user, said remote network having multiple locations linked together based upon a commonality of subject matter, comprising the steps of:

in response to user input, accessing sites which contain links to other sites;

identifying sites not previously accessed by said user having links thereto contained within said accessed sites;

prioritizing sites not previously accessed by said user according to a number of links thereto contained within said accessed sites;

providing said user with an indication of priority of sites not previously accessed by said user according to said number of links to each of said sites not previously accessed by said user contained within said accessed sites;

wherein said steps of accessing, identifying, prioritizing, and providing are performed within a client computer system.

2. The method of claim 1 wherein the step of identifying sites not previously accessed by said user having links contained within said accessed sites, further comprises the step of:

compiling a list of sites having links from said accessed sites.

3. The method of claim 2 wherein the step of prioritizing sites not previously accessed by said user according to a number of links contained within said accessed sites, further comprises the step of:

arranging said list of sites having links from said accessed sites according to a number of links contained within said accessed sites.

4. The method of claim 3 further comprising the step of:

in response to arranging said list of sites having links from said accessed sites according to a number of links contained within said accessed sites, designating said links as interesting based on said arrangement.

5. The method of claim 4 wherein the step of providing said user with an indication of priority of sites not previously accessed by said user according to said number of links to each of said sites not previously accessed by said user contained within said accessed sites, further comprises the steps of:

displaying said links to each of said sites not previously accessed by said user contained within said accessed sites within a window of a graphic interface; and highlighting said links to each of said sites not previously accessed by said user contained within said accessed sites within a window of a graphic interface.

6. The method of claim 5 wherein the step of highlighting said links to each of said sites not previously accessed by said user contained within said accessed sites within a window of a graphic interface, further comprises the step of:

means for arranging said list of sites having links to said accessed sites according to a number of links contained within said accessed sites.

7. A system for identifying prospective sites in a remote network, for which a user may have an affinity, by detecting links to specific sites within sites previously accessed by a user, said remote network having multiple locations linked together based upon a commonality of subject matter, comprising:

means for accessing sites which contain links to other sites, in response to user input;

means for identifying sites not previously accessed by said user having links thereto contained within said accessed sites;

means for prioritizing sites not previously accessed by said user according to a number of links thereto contained within said accessed sites;

means for providing said user with an indication of priority of sites not previously accessed by said user according to said number of links to each of said sites not previously accessed by said user contained within said accessed sites;

wherein said means for accessing, identifying, prioritizing, and providing are included within a client computer system.

8. The system of claim 7 wherein said means for identifying sites not previously accessed by said user having links contained within said accessed sites, further comprises:

means for compiling a list of sites having links from said accessed sites.

9. The system of claim 8 wherein said means for prioritizing sites not previously accessed by said user according to a number of links contained within said accessed sites, further comprises:

means for arranging said list of sites having links from said accessed sites according to a number of links contained within said accessed sites.

10. The system of claim 9 further comprising:

means for designating said links as interesting based on said arrangement, in response to arranging said list of sites having links from said accessed sites according to a number of links contained within said accessed sites.

11. The system of claim 10 wherein said means for providing said user with an indication of priority of sites not previously accessed by said user according to said number of links to each of said sites not previously accessed by said user contained within said accessed sites, further comprises:

means for displaying said links to each of said sites not previously accessed by said user contained within said accessed sites within a window of a graphic interface; and means for highlighting said links to each of said sites not previously accessed by said user contained within said accessed sites within a window of a graphic interface.

12. The system of claim 11 wherein said means for highlighting said links to each of said sites not previously accessed by said user contained within said accessed sites within a window of a graphic interface, further comprises:

means for adjusting a strength of said highlighting according to said prioritization.

13. A program product residing in computer memory in a computer system, for identifying prospective sites in a remote network, for which a user may have an affinity, by detecting links to specific sites within sites previously accessed by a user, said remote network having multiple locations linked together based upon a commonality of subject matter, comprising:

means for accessing sites which contain links to other sites, in response to user input;

means for identifying sites not previously accessed by said user having links thereto contained within said accessed sites;

means for prioritizing sites not previously accessed by said user according to a number of links thereto contained within said accessed sites;

means for providing said user with an indication of priority of sites not previously accessed by said user according to said number of links to each of said sites not previously accessed by said user contained within said accessed sites;

wherein said means for accessing, identifying, prioritizing, and providing are included within a client computer system;

signal bearing media means bearing:

said means for accessing sites which contain links to other sites, in response to user input;

said means for identifying sites not previously accessed by said user having links thereto contained within said accessed sites;

said means for prioritizing sites not previously accessed by said user according to a number of links thereto contained within said accessed sites;

said means for providing said user with an indication of priority of sites not previously accessed by said user according to said number of links to each of said sites not previously accessed by said user contained within said accessed sites.

14. The program product of claim 13 wherein said means for identifying sites not previously accessed by said user having links contained within said accessed sites, further comprises:

means for compiling a list of sites having links from said accessed sites.

15. The program product of claim 14 wherein said means for prioritizing sites not previously accessed by said user according to a number of links contained within said accessed sites, further comprises:

means for arranging said list of sites having links from said accessed sites according to a number of links contained within said accessed sites.

16. The program product of claim 15 further comprising:

means for designating said links as interesting based on said arrangement, in response to arranging said list of sites having links from said accessed sites according to a number of links contained within said accessed sites; and said signal bearing media further comprises signal bearing media bearing:

means for designating said links as interesting based on said arrangement, in response to arranging said list of sites having links from said accessed sites according to a number of links contained within said accessed sites.

17. The program product of claim 16 wherein said means for providing said user with an indication of priority of sites not previously accessed by said user according to said number of links to each of said sites not previously accessed by said user contained within said accessed sites, further comprises:

means for displaying said links to each of said sites not previously accessed by said user contained within said accessed sites within a window of a graphic interface; and means for highlighting said links to each of said sites not previously accessed by said user contained within said accessed sites within a window of a graphic interface.

18. The program product of claim 17 wherein said means for highlighting said links to each of said sites not previously accessed by said user contained within said accessed sites within a window of a graphic interface, further comprises:

means for adjusting a strength of said highlighting according to said prioritization.

19. The program product of claim 18 wherein said signal bearing media further comprises transmission media.

20. The program product of claim 18 wherein said signal bearing media further comprises recordable media.

* * * * *